United States Patent [19]

Walker

[11] Patent Number: 4,811,489
[45] Date of Patent: Mar. 14, 1989

[54] PIPE FITTERS TAPE MEASURE STRIP

[76] Inventor: Don W. Walker, P.O. Box 245, Arcadia, Tex. 77517

[21] Appl. No.: 101,402

[22] Filed: Sep. 28, 1987

Related U.S. Application Data

[63] Continuation-in-part of Ser. No. 871,889, Jun. 6, 1986, Pat. No. 4,696,110.

[51] Int. Cl.⁴ .............................................. G01B 3/10
[52] U.S. Cl. .................................. 33/759; 33/494; 33/476; 33/679.1; 33/529
[58] Field of Search .................. 33/137 R, 494, 529, 33/476, 293; 116/DIG. 46, 334

[56] References Cited

U.S. PATENT DOCUMENTS

| | | | |
|---|---|---|---|
| 66,120 | 6/1867 | Bigelow | 33/494 |
| 812,322 | 2/1906 | Badger | 33/137 R |
| 861,799 | 7/1907 | Breil | 33/494 |
| 924,671 | 6/1909 | Klie | 33/494 |
| 1,081,673 | 12/1913 | Keuffel | 33/137 R |
| 1,145,244 | 7/1915 | Hoffmann | 33/137 R |
| 1,387,599 | 8/1921 | Grout | 33/494 |
| 1,643,166 | 9/1927 | Martin | 33/137 R |
| 2,140,714 | 12/1938 | Palmer | 33/494 |
| 2,792,110 | 5/1957 | Wanish | 33/137 R |
| 3,270,421 | 9/1966 | Jones | 33/137 R |
| 4,149,320 | 4/1979 | Troyer et al. | 33/137 R |
| 4,484,395 | 11/1984 | Samuels | 33/494 |
| 4,696,110 | 9/1987 | Walker et al. | 33/137 R |

FOREIGN PATENT DOCUMENTS

| | | | |
|---|---|---|---|
| 152401 | 11/1980 | Japan | 33/494 |
| 12395 | of 1894 | United Kingdom | 33/494 |

Primary Examiner—Harry N. Haroian
Attorney, Agent, or Firm—Fleit, Jacobson, Cohn & Price

[57] ABSTRACT

A pipe fitter's tape measuring strip of 25-foot length is marked on one surface with cumulative inch markings along one edge, with information providing take-off charts along the other edge at a leading end of the strip and with cumulative foot and inch markings following the charts along the remainder of the strip length. The opposite surface of the strip is marked with charts providing information on flange sizes related to different pipe sizes. The length indicating indicia includes graduation lines with each 1/16, ⅛ and ¼ inch graduation line having a black dot at the inner end, each one inch graduation line having a larger black dot at the inner end thereof and each ½ inch graduation line having a horizontal, short black slash line at the inner end thereof to render the tape measure easier to read.

8 Claims, 1 Drawing Sheet

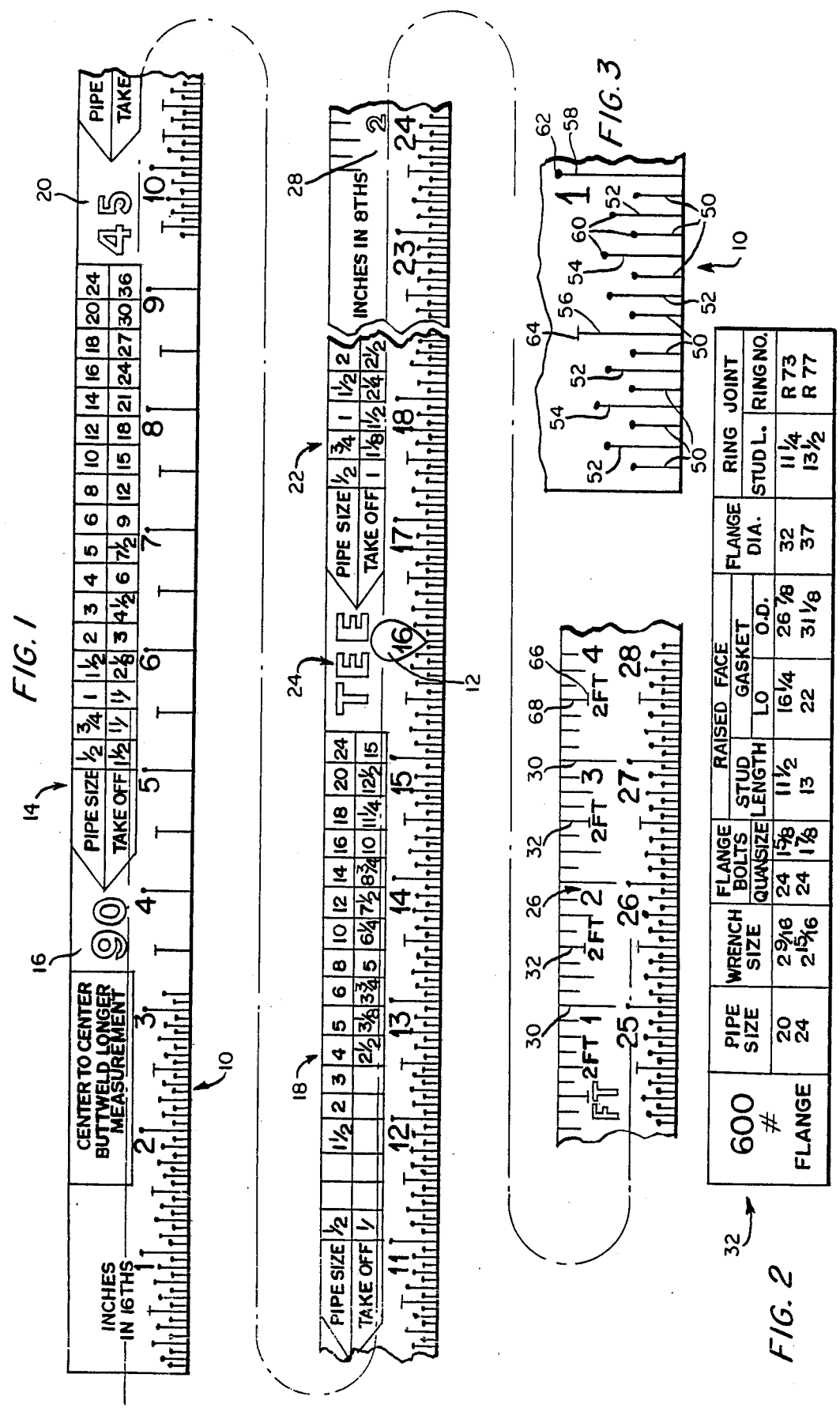

PIPE FITTERS TAPE MEASURE STRIP

This application is a continuation-in-part of U.S. patent application Ser. No. 871,889, for Pipe Fitters Tape Measure, now U.S. Pat. No. 4,696,110, issued Sept. 29, 1987 filed June 6, 1986.

BACKGROUND AND SUMMARY OF THE INVENTION

This invention relates to a tape measure strip particularly suitable for use by a pipe fitter but which may also be used by other workers, such as boilermakers, welders, layout persons, mill rights, and iron workers. Carpenters may also have use for a tape measure strip in accordance with the invention.

The tape measure strip in accordance with the invention is a standard English tape strip having highliner black dots and black slash marks associated with the graduation lines so that the tape measure is easier to read. The strip has aids for the pipe fitter on one surface of the strip, with further aids, charts, and the like on the other surface. The strip is a unique item produced mainly for use with pipe fitting. The tape strip may be housed in a conventional housing of the retractable type.

A tape strip in accordance with the invention may, for example, have a length of 25 feet and have a surface marked adjacent one edge with first measuring indicia along the entire length of the strip and along an opposite edge adjacent a leading portion of the strip with separate end-to-end take-off charts extending lengthwise along the strip providing information respectively for different pipe fittings. The opposite edge of the one surface of the strip is also marked with further measuring indicia along the length of the strip following the charts. The first measuring indicia includes cumulative inch markings along the length of the strip with selected markings at repeated multiple-inch spacings being distinctively marked.

The further measuring indicia includes cumulative footage markings at the respective footage intervals and inch markings from 1 to 11 between each foot marking. The further indicia also includes total footage markings between selected inch marks.

Each take-off chart includes an identifying mark at one end thereof, a lengthwise column of pipe size marks, and an adjacent registering column of corresponding take-off marks. The opposite surface of the strip is also marked with respective charts located end to end to provide information for different size pipe flanges related to different pipe sizes.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a sectionalized face view of a leading portion of one surface of a pipe fitter's strip in accordance with the invention.

FIG. 2 is a face view of part of the opposite surface of the strip.

FIG. 3 is an enlarged view of a portion of FIG. 1.

DESCRIPTION OF THE PREFERRED EMBODIMENTS

A pipe fitter's tape strip in accordance with the invention is, for example, 25 feet long and 1 inch wide, the strip is made of conventional material and preferably is wound on a reel in a conventional type of retractable housing. FIG. 1 of the drawings illustrates the leading portion of one surface of the strip, and FIG. 2 illustrates a chart marked on the opposite surface of the strip.

Referring firstly to FIG. 1, the strip has standard English measurements marked hereon. Thus, the strip has a first set of indicia, generally indicated at 10 along a lower edge thereof and extending perpendicular to the lower edge. These indicia 10 include measuring lines marked along the entire length of the strip in an inch sequence from 1 through 300, with 1/16-inch markings therebetween. Further, selected inch markings at repetitive multi-inch intervals are distinctly marked. In the illustrated example, a contrasting color highlighter portion 12 is marked at 16-inch intervals up to the 16-foot mark for aiding carpenters in laying out 16-inch centers between studs.

The indicia 10, as shown in enlarged view in FIG. 3, includes 1/16-inch measuring lines 50, ⅛-inch measuring lines 52, ¼-inch measuring lines 54, ½-inch measuring line 56, and inch measuring line 58. Each of the lines 50, 52, and 54 terminate in a solid black dot 60 of equal diameter. Inch marking line 58 terminates in a solid black dot 62, which is of a diameter greater than a diameter of dot 60, preferably having a diameter twice the diameter of dot 60. Half-inch measuring line 56 terminates in a slash line 64, which extends perpendicular to the direction of half-inch measuring line 56. This pattern of measuring lines is repeated along the entire length of the strip, except at the highlighter portion 12, which indicates a 16-inch spacing between highlighter portions.

Along its first two feet of length, the tape strip also has on the first surface, a series of end-to-end printed pipe fitting take-off charts. Thus, a first chart indicated at 14 is for a 90° pipe fitting and has an upper column of pipe sizes and a corresponding lower column of take-off marks with an indicator mark 16 at the leading end of the chart. Chart 14 is followed by a similar chart 18 with an indicator mark 20 for 45° pipe fittings, and this, in turn, is followed by a further chart 22 with an identifying mark 24 for Tee fittings.

Following the chart 22, along the upper edge of the strip, is a further set of indicia 26. The further indicia 26 include sequential foot markings starting with a 2-foot mark 28, the respective foot markings being located at the relative footage intervals, and inch markings 30 from 1 through 11 between the respective foot markings, with each inch divided into ⅛-inch markings. Further, there are provided additional cumulative foot measuring lines 32 between selected inch markings and preferably between each inch mark.

In addition, the half-inch measuring line 68 of indicia 26 also terminates in perpendicular slash line 66, which extends perpendicular to the direction of the half-inch measuring line 68. The slash line at the terminal end of each one-half inch measuring line visually keeps the dots 60 and 62 from appearing to run together and causes dots 60 and 62 to stand out from the background of the strip. The combination of the dots and slash line provides quick reference for counting of separations between the 1-inch measuring lines.

In use, a pipe fitter needing to connect two 4-inch lines of pipe together, having a center-to-center measurement from one pipe to the other pipe of 20 feet, needs to use two 90° pipe fittings. The pipe fitter looks at the 90° chart, and on the pipe size line for 4-inch pipe size. Directly under the 4 on the take-off line is printed the number 6. The pipe fitter then knows he has to subtract 6 inches of pipe for each fitting. Since the pipe fitter is using 90° fittings, a total of 12 inches on the 20-foot center-to-center measurement will be removed. The pipe fitter then knows that a 19 foot joint of pipe and two 90° fittings will complete the run. The take-off chart, therefore, indicates the amount of inches taken off when using a particular type of fitting for a particular size of pipe.

It is understood that the respective sets of indicia 10 and 26 extend throughout the length of the strip.

The opposite surface of the strip is marked repetitively and sequentially with a series of flange charts, such as chart 32 shown in FIG. 2. Each flange chart is for a different flange series, for example, in numbers 150, 300, and 600 covering pipe sizes of 1 inch to 24 inches. Each chart shows the respective pipe size, wrench size, flange bolt quantity and size, raised face stud length of bolts, raised face gasket inside diameter and outside diameter, flange diameter, ring joint stud length, plus the ring joint ring number of each flange series.

Preferably, the most used charts which are generally the number 150 and number 300, will be located at the leading end of the strip.

The unique arrangement of markings placed on the tape strip provides a highliner dot tape strip which constitutes the greatest innovation to be incorporated into or placed on a tape measure inasmuch as the black dot system on the tip end of each 1/16, ⅛ and ¼-inch graduation line and the larger and bolder black dot on the tip end of the one-inch graduations and the horizontal slash line on the tip end of the ½-inch graduations produces the easiest to read tape measure that has been available heretofore. The 1/16-inch graduations on the lower portion of the tape have a black dot on the tip end while the ⅛-inch graduations on the upper portion of the tape strip do not have black dots. Also, the one-inch graduations on the upper portion of the tape strip do not have black dots. However, the ½-inch graduations on the upper portion of the strip each have a black horizontal slash mark on the tip end so that only the ½-inch graduations on the upper portion of the tape strip have highliner markings.

The black dots and slash marks visually help produce an easy to read tape measure strip with the slash marks serving to keep the black dots from running together visually thereby enhancing the capability of the human eye to maintain visual distinction of the graduations. The large black dots on the one-inch graduations keep the lines from blurring or running together as occurs when using standard graduation lines on tape measures such as are currently available on the market. When a standard tape measure strip and a strip with the highliner markings of this invention are placed in side-by-side relation, there is an amazing different in the readibility of the tape strip with the graduation on the strip with dots and slashes being much clearer and easier to read.

The foregoing is considered as illustrative only of the principles of the invention. Further, since numerous modifications and changes will readily occur to those skilled in the art, it is not desired to limit the invention to the exact construction and operation shown and described; and, accordingly, all suitable modifications and equivalents may be resorted to, falling within the scope of the invention.

I claim:

1. A pipe fitter's measuring tape comprising:
   a strip having two side surfaces,
   one of said two side surface being marked adjacent one edge in 1-inch intervals and subdivided into 1/16-inch intervals with measuring lines extending perpendicular to said one edge, and
   in each inch interval one of said measuring lines terminates in a slash line extending perpendicular to said one measuring line, and the remainder of said measuring lines in each inch interval of lines terminate in dots, the diameter of a dot located at a terminus of a measuring line indicating an inch interval being greater than the diameter of a dot located at a terminus of the other measuring lines.

2. A pipe fitter's measuring tape as in claim 1, wherein an opposite edge of said one surface includes measuring lines having a slash line at a terminus of measuring lines indicating ½-inch markings.

3. A pipe fitter's measuring tape as in claim 2, wherein said opposite edge includes a leading end portion with separate end-to-end take-off charts extending lengthwise of the strip to provide information respectively for different pipe fittings.

4. A pipe fitter's measuring tape as in claim 1, wherein a highlighter portion is spaced along the length of said strip at 16-inch intervals.

5. A pipe fitter's measuring tape as in claim 2, wherein said opposite edge includes cumulative footage markings at respective footage intervals, and inch markings from 1 to 11 between each footage marking.

6. A pipe fitter's measuring tape as in claim 1, wherein the outer surface of said strip is marked with respective charts located end-to-end to provide information of different size pipe flanges related to different pipe sizes.

7. A pipe fitter's measuring tape comprising:
   a strip having a front surface and a back surface,
   said front surface being marked adjacent one edge with first measuring indicia along the length of the strip, one of said first measuring indicia being cumulative one-inch graduation lines with each one-inch graduation line terminating in a dot, said first measuring indicia including one-half inch graduation lines with each one-half inch graduation line terminating in a slash line extending perpendicular to said one-half inch graduation line and the remainder of said first measuring indicia being 1/16, ⅛ and ¼ inch graduation lines each terminating in a dot, and separate end-to-end take-off charts extending lengthwise along an opposite edge adjacent a leading first end portion of the strip lengthwise to provide information respectively for different pipe fittings, said opposite edge of said front surface being maarked with further measuring indicia along a second portion of the length of the strip following the first end portion having said charts thereon, said strip measuring a number of feet in length, said first measuring indicia including cumulative inch markings along the length of the strip with selected inch markings repeated at 16-inch spaces being distinctively marked, said further indicia including cumulative footage markings to the respective footage intervals, and inch markings from 1 to 11 between each footage marking, said further indicia markings also including total footage marks between selected inch marks, each of said take-off charts having an identifying mark at one end thereof, a lengthwise column of pipe size marks, and an adjacent registering column of corresponding take-off marks, said back surface of said strip being marked with respective charts located end-to-end and providing information of different size pipe flanges related to different pipe sizes with the most frequently used charts being located at a leading end portion of the strip.

8. A pipe fitter's measuring tape strip having a front surface marked adjacent one edge with first measuring indicia along the entire length of the strip, and along an opposite edge adjacent a leading first end portion of the strip with separate end-to-end take-off charts extending lengthwise of the strip providing information respectively for different pipe fittings, said opposite edge of said front surface being marked with further measuring indicia along a second portion of the length of the strip following the first end portion having said charts thereon, said strip measuring a number of feet in length, said first measuring indicia including cumulative inch markings along the length of the strip with selected inch markings repeated at 16 inch spaces being distinctively marked, said further indicia including cumulative footage markings at the respective footage intervals, and inch markings from one to eleven between each footage marking, said further indicia markings also including total footage marks between selected inch marks, each of said take-off charts comprising an identifying mark at one end thereof, a lengthwise column of pipe size marks, and an adjacent registering column of corresponding take-off marks, the opposite surface of said strip is marked with respective charts located end-to-end and providing information of different size pipe flanges related to different pipe sizes with the most frequently used charts being located at a leading end portion of the strip, said first measuring indicia including fractional inch markings in addition to said inch markings with all of said markings being graduation lines, each one-inch graduation line having a black dot on the inner tip, each 1/16, ⅛ and ¼-inch graduation line having a black dot on the inner tip which is smaller than the block dot on the one-inch graduation lines and a horizontal black slash line on the inner tip of each ½-inch graduation line to enable easier reading of the indicia.

* * * * *